United States Patent
Patel et al.

(10) Patent No.: US 11,080,215 B1
(45) Date of Patent: Aug. 3, 2021

(54) HOST DEVICE PROVIDING AUTOMATED PREDICTION OF CHANGE INTERVALS TO REDUCE ADVERSE IMPACTS ON APPLICATIONS

(71) Applicant: EMC IP Holding Company LLC, Hopkinton, MA (US)

(72) Inventors: Rimpesh Patel, Bangalore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/836,147

(22) Filed: Mar. 31, 2020

(51) Int. Cl.
*G06F 13/16* (2006.01)

(52) U.S. Cl.
CPC .............................. *G06F 13/1668* (2013.01)

(58) Field of Classification Search
None
See application file for complete search history.

(56) References Cited

U.S. PATENT DOCUMENTS

| | | | |
|---|---|---|---|
| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |

(Continued)

FOREIGN PATENT DOCUMENTS

| CN | 103677927 B | 2/2017 |
|---|---|---|
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Michael Sun
(74) *Attorney, Agent, or Firm* — Ryan, Mason & Lewis, LLP

(57) ABSTRACT

A host device is configured to monitor host device operating parameters relating to its interaction with a storage system over a plurality of intervals, and for each of the intervals, to aggregate threshold-based assessments of respective ones of the monitored host device operating parameters and to classify the intervals based at least in part on the aggregated threshold-based assessments. The host device is further configured to identify a particular future interval for use as a change interval for changing one or more characteristics of an operating environment of the host device based at least in part on the classified intervals. Aggregating the threshold-based assessments and classifying based on the aggregated assessments for a given interval illustratively comprises computing a bit value for the given interval as a function of the aggregated assessments, and updating a bitmap to include the computed bit value in an entry corresponding to the given interval.

20 Claims, 4 Drawing Sheets

(56) References Cited

U.S. PATENT DOCUMENTS

| | | |
|---|---|---|
| 7,904,681 B1 | 3/2011 | Bappe et al. |
| 7,925,872 B2 | 4/2011 | Lai et al. |
| 8,244,566 B1* | 8/2012 | Coley ................. G06Q 10/109 705/7.11 |
| 8,250,256 B2 | 8/2012 | Ghosalkar et al. |
| 8,285,825 B1 | 10/2012 | Nagaraj et al. |
| 8,325,627 B2* | 12/2012 | Pratt, Jr. ........... H04W 72/0446 370/255 |
| 8,825,919 B1 | 9/2014 | Lim et al. |
| 8,832,334 B2 | 9/2014 | Okita |
| 8,838,931 B1* | 9/2014 | Marshak ............... G06F 3/0649 711/170 |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,477,408 B1* | 10/2016 | Perlstein ............... G06F 3/0679 |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,924,548 B1* | 2/2021 | Karumbunathan .......................... H04L 61/1582 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2013/0132546 A1* | 5/2013 | Vicat-Blanc Primet ..................... H04L 41/02 709/223 |
| 2014/0105068 A1 | 4/2014 | Xu |
| 2014/0146648 A1* | 5/2014 | Alber ................. G06F 11/0727 369/53.1 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0260125 A1* | 9/2018 | Botes ....................... G06F 3/067 |
| 2018/0317101 A1 | 11/2018 | Koue |
| 2019/0095299 A1 | 3/2019 | Liu et al. |
| 2019/0108888 A1 | 4/2019 | Sarkar et al. |
| 2020/0097203 A1 | 3/2020 | Mallick et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al. filed Oct. 27, 2017, and entitled "Storage System with Network-Wide Configurable Device Names."

U.S. Appl. No. 16/145,502 filed in the name of Vinay G. Rao et al. filed Sep. 28, 2018, and entitled "Host Device with Multi-Path Layer Implementing Path Selection Based at Least in Part on Fabric Identifiers."

U.S. Appl. No. 16/155,429 filed in the name of Rimpesh Patel et al. filed Oct. 9, 2018, and entitled "Categorizing Host IO Load Pattern and Communicating Categorization to Storage System."

U.S. Appl. No. 16/155,491 filed in the name of Kundan Kumar et al. filed Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

* cited by examiner

HOST DEVICE PROVIDING AUTOMATED PREDICTION OF CHANGE INTERVALS TO REDUCE ADVERSE IMPACTS ON APPLICATIONS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. It is often necessary in these and other storage contexts to make changes in an operating environment of the host devices that interact with the storage system. For example, various types of software, firmware and hardware upgrades may be necessary. Determining appropriate intervals for making such changes typically involves host administrator performance of an unduly complex manual estimation process. These determinations under conventional practice are therefore costly, time-consuming and error-prone, potentially leading to situations in which implementing the changes results in severe adverse impacts on executing applications.

SUMMARY

Illustrative embodiments provide techniques for automated prediction of change intervals in at least one host device configured to interact with a storage system, in a manner that substantially reduces adverse impacts on one or more applications executing on the one or more host devices, thereby advantageously avoiding the drawbacks of the conventional techniques described above.

For example, some embodiments automatically predict optimal change intervals so as to minimize adverse impacts on applications. The predicted optimal change intervals are illustratively utilized to make one or more changes in an operating environment of the one or more host devices while minimizing adverse impacts on applications, such as degradations in IO processing performance while the one or more changes are carried out.

In some embodiments, at least portions of the automated change interval prediction functionality are implemented in at least one host driver, such as a multi-path input-output (MPIO) driver of a host device. Other types of host drivers or host device components can be used in place of or in addition to one or more MPIO drivers.

As indicated above, conventional approaches to determining change intervals are problematic, in that a host administrator or other user generally has to perform an unduly complex manual estimation process in order to attempt to determine appropriate change intervals. Illustrative embodiments disclosed herein provide highly automated change interval prediction arrangements that avoid the complications of conventional approaches, while also predicting with high accuracy particular intervals that can minimize or otherwise reduce adverse impacts on applications.

In one embodiment, an apparatus comprises a host device that includes a processor and a memory, with the processor being coupled to the memory. The host device is configured to communicate with a storage system.

The host device is further configured to monitor host device operating parameters relating to its interaction with the storage system over a plurality of intervals, and for each of the intervals, to aggregate threshold-based assessments of respective ones of the monitored host device operating parameters and to classify the intervals based at least in part on the aggregated threshold-based assessments. The host device is further configured to identify a particular future interval for use as a change interval for changing one or more characteristics of an operating environment of the host device based at least in part on the classified intervals.

The host device in some embodiments is further configured to schedule implementation of the change in the one or more characteristics of the operating environment of the host device in the identified particular future interval.

The host device operating parameters illustratively comprise two or more of at least number of IO operation failures, number of IO operation retries, IO operation throughput, host device memory usage and host device processor usage. Additional or alternative host device operating parameters relating to its interaction with the storage system over multiple intervals can be used in other embodiments.

In some embodiments, the host device further comprises a multi-path layer comprising at least one MPIO driver configured to control delivery of IO operations from the host device to particular ports of the storage system over selected ones of a plurality of paths through a network. The host device may be one of a plurality of host devices that includes one or more additional host devices each configured to communicate over the network with the storage system and wherein each additional host device comprises at least one MPIO driver configured to control delivery of IO operations from that host device to particular ports of the storage system over selected ones of a plurality of paths through the network.

The paths are illustratively associated with respective initiator-target pairs with each of a plurality of initiators of the initiator-target pairs comprising a corresponding host bus adaptor of the host device and each of a plurality of targets of the initiator-target pairs comprising a corresponding one of the ports of the storage system.

In some embodiments, aggregating threshold-based assessments of respective ones of the monitored host device operating parameters for a given interval and classifying the interval based at least in part on the aggregated threshold-based assessments illustratively comprises, responsive to all of the threshold-based assessments of respective ones of the monitored host device operating parameters for the given interval indicating that the interval is designated as preferred, classifying the interval as preferred across the monitored host device operating parameters, and responsive to at least one of the threshold-based assessments of respective ones of the monitored host device operating parameters for the given interval indicating that the interval is designated as non-preferred, classifying the interval as non-preferred across the monitored host device operating parameters.

Additionally or alternatively, aggregating threshold-based assessments of respective ones of the monitored host device operating parameters for a given interval and classifying the interval based at least in part on the aggregated threshold-based assessments illustratively comprises computing a bit value for the given interval as a function of the aggregated threshold-based assessments, and updating a bitmap to include the computed bit value in an entry corresponding to the given interval. Other types of data structures may be used in addition to or in place of bitmaps in other embodiments.

In some embodiments, a bitmap is maintained for a particular time span that includes the given interval and a plurality of other intervals, and wherein separate bitmaps are maintained for respective other time spans each including a same number of intervals as the particular time span. In such an embodiment, identifying a particular future interval for use as a change interval for changing one or more characteristics of an operating environment of the host device based at least in part on the classified intervals comprises identifying a particular future time interval as a time interval that is repeatedly classified as preferred across multiple ones of the bitmaps maintained for respective time spans.

Different sets of bitmaps may be maintained for the host device and one or more additional host devices configured to communicate with the storage system, and in such arrangements identifying a particular future interval for use as a change interval for changing one or more characteristics of an operating environment of the host device based at least in part on the classified intervals illustratively comprises identifying a particular future time interval as a time interval that is repeatedly classified as preferred across multiple ones of the bitmaps maintained for respective time spans for each of the host devices.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
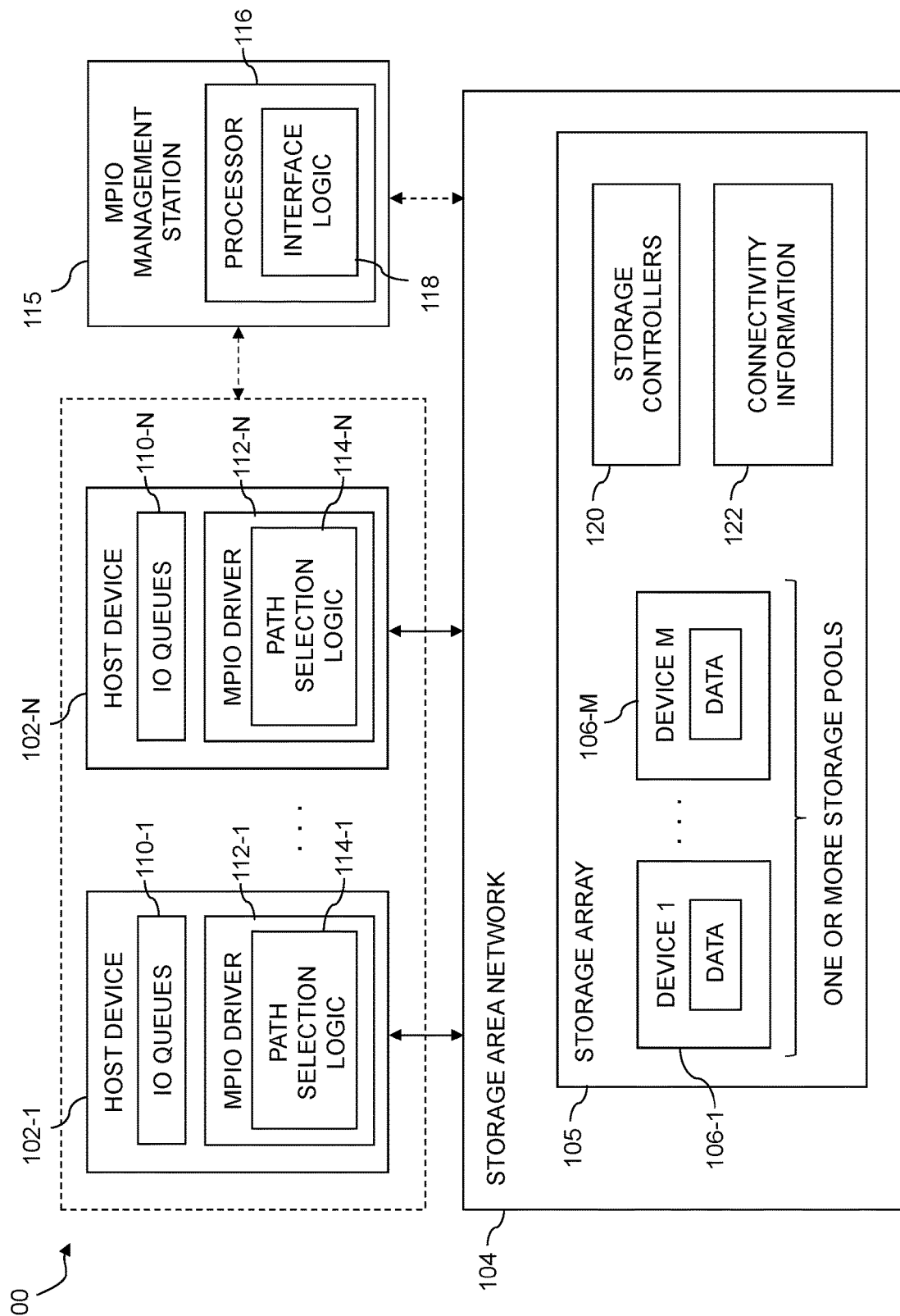
FIG. 1 is a block diagram of an information processing system configured with functionality for automated prediction of change intervals using a multi-path layer of a host device in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. The multi-path layer provides functionality for automated change interval prediction. Such functionality is provided at least in part using respective instances of path selection logic 114-1, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for automated change interval prediction. Other types of MPIO drivers from other driver vendors may be suitably modified to incorporate functionality for automated change interval prediction as disclosed herein.

The system 100 further comprises an MPIO management station 115 that includes a processor 116 implementing interface logic 118. The interface logic 118 is utilized to communicate with the host devices 102 and the storage array 105. Such an MPIO management station 115 provides management functionality for the multi-path layer comprising the MPIO drivers 112 of the host devices 102. In some embodiments, host device management software executing on the MPIO management station 115 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to monitor host device operating parameters relating to its interaction with the storage array 105 over a plurality of intervals. For each of the intervals, the MPIO driver 112-1 aggregates threshold-based assessments of respective ones of the monitored host device operating parameters and classifies the interval based at least in part on the aggregated threshold-based assessments. The MPIO driver 112-1 identifies a particular future interval for use as a change interval for changing one or more characteristics of an operating environment of the host device based at least in part on the classified intervals. Such an identified future interval is an example of what is referred to herein as a "predicted change interval." The MPIO driver 112-1 is illustratively further configured to schedule implementation of the change in the one or more characteristics of the operating environment of the host device in the identified particular future interval. An example of a process including such operations will be described below in conjunction with the flow diagram of FIG. 2. These and other operations referred to herein as being performed by an MPIO driver can in other embodiments be performed at least in part by other host device components.

The above-noted host device operating parameters illustratively comprise two or more of the following: number of IO operation failures, number of IO operation retries, IO operation throughput, host device memory usage and host device processor usage. Additional or alternative host device operating parameters can be monitored in other embodiments using the techniques disclosed herein.

A given IO operation in the context of host device operating parameters such as IO operation failures, retries or throughput is illustratively generated by a process of an application running on the host device 102-1, and is queued in a given one of the IO queues 110-1 of the host device 102-1 with other operations generated by other processes of that application, and possibly other processes of other applications.

In the case of the host device operating parameter comprising number of IO operation failures, the threshold-based assessment of that operating parameter illustratively comprises designating a particular one of the intervals as preferred for the given parameter responsive to the number of IO operation failures for the particular interval being below a threshold number of failures, and designating the particular interval as non-preferred for the given parameter responsive to the number of IO operation failures for the particular interval being at or above the threshold number of failures.

In the case of the host device operating parameter comprising number of IO operation retries, the threshold-based assessment of that operating parameter illustratively comprises designating a particular one of the intervals as preferred for the given parameter responsive to the number of IO operation retries for the particular interval being below a threshold number of retries, and designating the particular interval as non-preferred for the given parameter responsive to the number of IO operation retries for the particular interval being at or above the threshold number of retries.

In the case of the host device operating parameter comprising IO operation throughput, the threshold-based assessment of that operating parameter illustratively comprises designating a particular one of the intervals as preferred for the given parameter responsive to the IO operation throughput for the particular interval being below a threshold amount of IO operation throughput, and designating the particular interval as non-preferred for the given parameter responsive to the IO operation throughput for the particular interval being at or above the threshold amount of IO operation throughput.

In the case of the host device operating parameter comprising host device memory usage, the threshold-based assessment of that operating parameter illustratively comprises designating a particular one of the intervals as preferred for the given parameter responsive to the host device memory usage for the particular interval being below a threshold amount of host device memory usage, and designating the particular interval as non-preferred for the given parameter responsive to the host device memory usage for the particular interval being at or above the threshold amount of host device memory usage.

In the case of the host device operating parameter comprising host device processor usage, the threshold-based assessment of that operating parameter illustratively comprises designating a particular one of the intervals as preferred for the given parameter responsive to the host device processor usage for the particular interval being below a threshold amount of host device processor usage, and designating the particular interval as non-preferred for the given parameter responsive to the host device processor usage for the particular interval being at or above the threshold amount of host device processor usage.

In some embodiments, aggregating threshold-based assessments of respective ones of the monitored host device operating parameters for a given interval and classifying the interval based at least in part on the aggregated threshold-based assessments illustratively comprises the following.

Responsive to all of the threshold-based assessments of respective ones of the monitored host device operating parameters for the given interval indicating that the interval is designated as preferred, classifying the interval as preferred across the monitored host device operating parameters.

Responsive to at least one of the threshold-based assessments of respective ones of the monitored host device operating parameters for the given interval indicating that the interval is designated as non-preferred, classifying the interval as non-preferred across the monitored host device operating parameters.

Additionally or alternatively, aggregating threshold-based assessments of respective ones of the monitored host device operating parameters for a given interval and classifying the interval based at least in part on the aggregated threshold-based assessments illustratively comprises computing a bit value for the given interval as a function of the aggregated threshold-based assessments, and updating a bitmap to include the computed bit value in an entry corresponding to the given interval.

Figure 4:
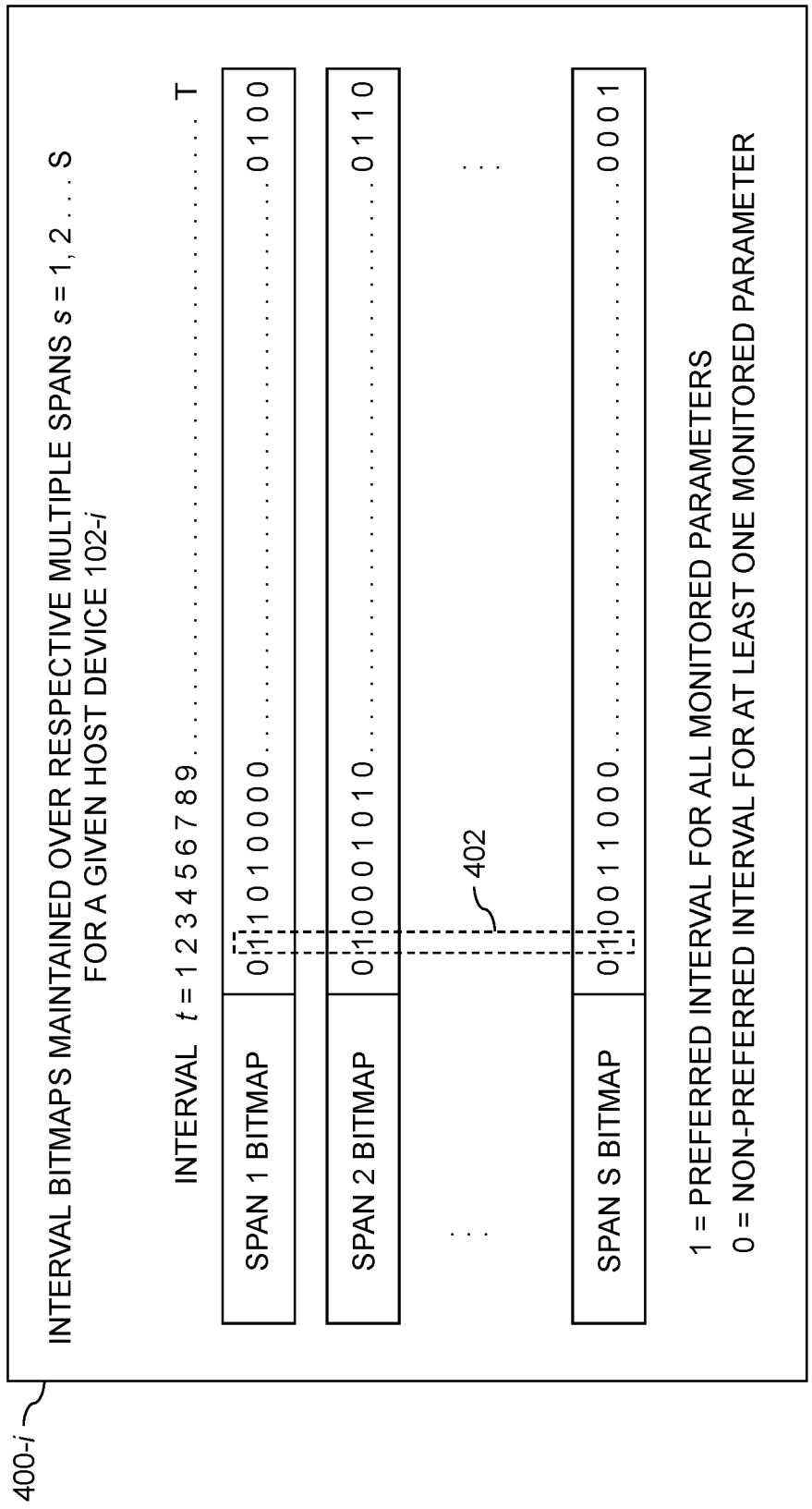
FIG. 4 shows an example of a set of interval bitmaps maintained over multiple time spans for a given host device in conjunction with automated prediction of change intervals in an illustrative embodiment.

In some embodiments, a bitmap is maintained for a particular time span that includes the given interval and a plurality of other intervals, and separate bitmaps are maintained for respective other time spans each including a same number of intervals as the particular time span. Example sets of bitmaps maintained for respective time spans each including a same number of time intervals are shown in FIG. 4. Other types of data structures can be used in place of or in addition to bitmaps in other embodiments.

In some embodiments, identifying a particular future interval for use as a change interval for changing one or more characteristics of an operating environment of the host device based at least in part on the classified intervals comprises identifying a particular future time interval as a time interval that is repeatedly classified as preferred across multiple ones of the bitmaps maintained for respective time spans.

For example, different sets of bitmaps are illustratively maintained for the host device 102-1 and one or more additional host devices 102 configured to communicate with the storage array 105. In such embodiments, identifying a particular future interval for use as a change interval for changing one or more characteristics of an operating environment of multiple ones of the host devices 102 based at least in part on the classified intervals comprises identifying a particular future time interval as a time interval that is repeatedly classified as preferred across multiple ones of the bitmaps maintained for respective time spans for each of the host devices 102.

These and other illustrative embodiments disclosed herein for predicting a preferable time for operating environment changes to one or more of the host devices 102 in order to minimize or otherwise avoid adverse impacts on applications running on those host devices. Such changes can additionally or alternatively comprise one or more changes to an operating environment of the storage array 105. Examples of changes that may be made include upgrades to one or more of hardware, software and firmware of at least one of the host devices 102 and/or the storage array 105. This includes, as more particular examples, host and/or storage array microcode upgrades, host-driven data migration, host HBA replacement, and numerous others.

These and other operating environment changes are advantageously performed in predicted change intervals using the techniques disclosed herein, so as to minimize or otherwise reduce adverse impacts to applications.

The predicted change intervals in some embodiments are indicative of particular intervals in which IO processing performance is sufficiently "healthy" to sustain a change in operating environment without unduly impacting executing applications.

As a more particular example, consider an embodiment that utilizes fixed-size time intervals of a user-configurable duration, but with a default value of 3 minutes. For each interval, a determination is made through aggregation of threshold-based assessments of the individual monitored operating parameters as to whether the interval as a whole is "preferred" or "non-preferred" for use as a future change interval. In this example, host multi-pathing software comprising the MPIO drivers 112 operates in the manner described below in monitoring host device operating parameters that include IO failures, IO retries, IO throughput, memory usage and processor (e.g., CPU) usage.

IO Failures

The host multi-pathing software detects if there have been any IO failures reported to an application since the last interval. Illustrative embodiments use a high-watermark IO_FAIL_HW (user configurable, default IO_FAIL_HW=3 per interval). The host multi-pathing software designates the interval as "preferred" if the IO failure count for the current interval is below IO_FAIL_HW and otherwise designates the interval as "non-preferred" with respect to this parameter.

IO Retries

The host multi-pathing software detects if IOs succeed on retry (e.g., an IO was failed on one particular path but after retrying on the same or another path it was successful) since the last interval. Some embodiments utilize a high-watermark IO_RETRY_HW (user configurable, default IO_RETRY_HW=10 per interval). The host multi-pathing software designates the interval as "preferred" if the IO retry count for the current interval is below IO_RETRY_HW and otherwise designates the interval as "non-preferred" with respect to this parameter.

IO Throughput

The host operating environment provides a native utility (e.g., one or more commands) to determine the IO throughput for the current interval. The host multi-pathing software makes use of this native utility to determine IO throughput. In some embodiments, a high-watermark IO_HW (user configurable, default IO_HW=90%), and a low-watermark IO_LW (user configurable, default IO_LW=45%) are utilized with respect to max benchmark_io_throughput (user configurable, default max benchmark_io_throughput=1024 Mbps). The host multi-pathing software designates the interval as "preferred" if current IO throughput is below IO_LW and otherwise designates the interval as "non-preferred" with respect to this parameter. However, it is user configurable for the host multi-pathing software to instead designate the interval as "preferred" if current IO throughput is below IO_HW and to otherwise designate the interval as "non-preferred" with respect to this parameter.

Memory Usage

The host operating environment provides a native utility (e.g., one or more commands) to determine the memory usage for the current interval. The host multi-pathing software makes use of this native utility to determine memory usage. Some embodiments utilize a high-watermark MEM_HW (user configurable, default MEM_HW=90%), and a low-watermark MEM_LW (user configurable, default MEM_LW=45%). The host multi-pathing software designates the interval as "preferred" if current memory usage is below MEM_LW and otherwise designates the interval as "non-preferred" with respect to this parameter. However, it is user configurable for the host multi-pathing software to instead designate the interval as "preferred" if current memory usage is below MEM_HW and to otherwise designate the interval as "non-preferred" with respect to this parameter.

CPU Usage

The host operating environment provides a native utility (e.g., one or more commands) to determine the CPU usage for the current interval. The host multi-pathing software makes use of this native utility to determine CPU usage. Some embodiments utilize a high-watermark CPU_HW (user configurable, default CPU_HW=90%), and a low-watermark CPU_LW (user configurable, default CPU_LW=45%). The host multi-pathing software designates the interval as "preferred" if current CPU usage is below CPU_LW and otherwise designates the interval as "non-preferred" with respect to this parameter. However, it is user configurable for the host multi-pathing software to instead designate the interval as "preferred" if current CPU usage is below CPU_HW and to otherwise designate the interval as "non-preferred" with respect to this parameter.

The above host device operating parameters are only examples, and additional or alternative parameters can be used in other embodiments. Also, the particular manner in which the intervals are classified for each such parameter are also presented by way of illustrative example only.

The host multi-pathing software can maintain a user configurable file or other types or arrangements of data structures for storing the above-described watermark values and other related information. The high-watermark and low-watermark values are examples of what are more generally referred to herein as "thresholds," and the above-described determinations based at least in part on one or more such thresholds are examples of what are more generally referred to herein as "threshold-based assessments." A user space utility and/or an IO control ("ioctl") interface can be used to obtain related information in some embodiments.

For a given host device, a current interval is categorized as "preferred" only if all of the monitored host device parameters are categorized as "preferred" for that interval.

In the present example, the multi-pathing software of the host device maintains a bitmap (or any data structure of implementation choice) to record the series of observations for every interval (user configurable, default=3 minutes), over a complete span (user configurable, default=24 hours) such that there exists a one-to-one mapping between bitmap and span. The host multi-pathing software can keep track of multiple such spans by maintaining multiple bitmaps (one for each span) for the periodicity P (user configurable, default P=5).

Using the above-noted default values, five bitmaps B1, B2, . . . B5 are maintained, each mapping to a span of length 24 hours, with each bitmap containing 480 bits (24 hr/3 min=480) where a single bit represents the corresponding interval in each span. Each bit has a value "1" or a value "0," with, for example, 1 indicating the interval as "preferred" and 0 indicating the interval as "non-preferred."

In order to schedule operating environment changes impacting a single host, predictive analysis is carried out on the bitmap(s) collected for this host and a consistently repetitive "preferred" interval is identified. A corresponding time interval in a next span or other future span is projected and used to schedule the operating environment change. This can be achieved, for example, by performing a bit-wise AND operation on all of the bitmaps to yield a resulting bitmap R where R=B1 & B2 & B3 & B4 & B5.

In order to schedule operating environment changes impacting multiple hosts (e.g., storage array operating environment changes, where multiple hosts are connected to the storage array), predictive analysis is carried out on the bitmap(s) collected for all of these hosts and a consistently repetitive common "preferred" interval is identified. A corresponding time interval in a next or future span is projected and used to schedule the operating environment change.

In some embodiments, this is achieved in two steps, as follows:

1. Resulting bitmaps R are constructed for respective hosts as previously described.

2. An aggregate bitmap A is constructed by performing a bit-wise AND operation on all such resulting bitmaps R of respective hosts, where A=R1 & R2 . . . & RN.

The host multi-pathing software can be configured to operate in conjunction with management appliance software (e.g., PowerPath® Management Appliance (PPMA)) to identify host connectivity to a given storage array, and to facilitate coordination between multiple host devices in order to allow computation of the aggregate bitmap A from the resulting bitmaps R of the individual host devices. Such management appliance software is illustratively implemented on MPIO management station 115. The host connectivity information is illustratively part of the connectivity information 122 of the storage array 105, and can be accessed by the MPIO drivers directly and/or via the MPIO management station 115.

In some embodiments, at least portions of the above-described example process for automated change interval prediction are performed by the MPIO management station 115, utilizing multi-pathing software executing on the processor 116. Accordingly, references above to "host multi-pathing software" are intended to be broadly construed, so as to encompass, in addition to MPIO drivers implemented on the host devices 102, other software relating to multi-pathing functionality of the host devices 102, such as host management software running on the MPIO management station 115.

As indicated previously, conventional techniques are unable to predict a preferable "healthy" time for operating environment changes to minimize or otherwise avoid possible negative impacts on application IO processing and/or other related functionality. Illustrative embodiments herein overcome these and other drawbacks of conventional techniques by categorizing time intervals and evaluating system health-check parameter values collectively, while also carrying out predictive analysis to determine if certain "preferred" (e.g., healthy) time intervals are consistently repetitive across spans.

Again, additional examples of automated change interval prediction are described below in conjunction with the embodiments of FIGS. 2 through 4.

In the FIG. 1 embodiment, the storage array 105 comprises a plurality of storage controllers 120 and one or more instances of connectivity information 122. The connectivity information 122 illustratively comprises information regarding the particular host devices 102 that have established connectivity to particular logical storage devices of the storage array 105. It is assumed in some embodiments that the MPIO drivers 112 of the host devices 102 can read or otherwise obtain at least portions of the connectivity information 122 from the storage array 105, although such an arrangement is not required.

At least portions of the connectivity information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, at least portions of the connectivity information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 115, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

A wide variety of other automated change interval prediction arrangements can be implemented using the obtained information. More particular examples of the above automated change interval prediction arrangements will be described elsewhere herein. Other types of automated change interval prediction arrangements can be used in other embodiments.

These and other functions related to automated change interval prediction that are referred to herein as being performed by or under the control of the MPIO driver 112-1 can in some embodiments be performed at least in part outside of the MPIO driver 112-1, such as in the host device 102-1 generally.

The above-described functions associated with automated change interval prediction in the MPIO driver 112-1 in some embodiments are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for automated change interval prediction.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automated change interval prediction.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
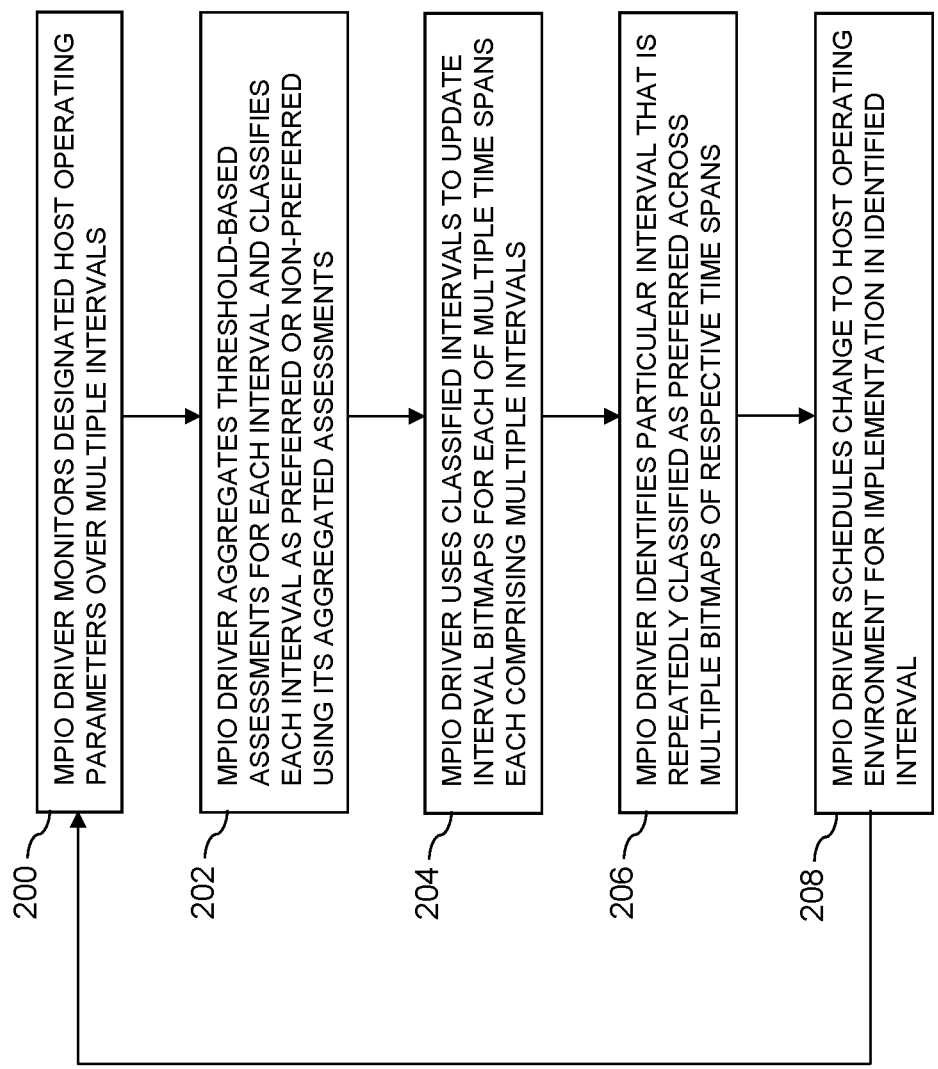
FIG. 2 is a flow diagram of a process for automated prediction of change intervals using a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, the MPIO driver monitors designated host operating parameters over multiple intervals. For example, the host device operating parameters illustratively comprise number of IO operation failures, number of IO operation retries, IO operation throughput, host device memory usage and host device processor usage. Different combinations of these or other host operating parameters can be monitored in other embodiments.

In step 202, the MPIO driver aggregates threshold-based assessments for each interval and classifies each interval as preferred or non-preferred using its aggregated assessments. For example, for each such interval, the MPIO driver performs a threshold-based assessment for each of the monitored host operating parameters, and aggregates the results of the different threshold-based assessments for that interval in order to classify the interval as either "preferred" or "non-preferred." In some embodiments, the interval is classified as preferred only if all of its threshold-based assessments indicate that the corresponding host operating parameters are designated as preferred for the interval, and otherwise the interval is classified as non-preferred. A preferred interval is one that may potentially be selected as a change interval in accordance with the techniques disclosed herein.

In step 204, the MPIO driver uses the classified intervals to update interval bitmaps for each of multiple time spans each comprising multiple intervals. An example of a set of interval bitmaps maintained for respective spans each containing a same number of time intervals will be described below in conjunction with FIG. 4.

In step 206, the MPIO driver identifies at least one particular interval that is repeatedly classified as preferred across multiple bitmaps of respective time spans. Such an interval is considered an example of a "predicted change interval" as that term is used herein. The interval is predicted as one that is likely to minimize adverse impact on host device applications if selected as a change interval.

In step 208, the MPIO driver schedules at least one change to a host operating environment for implementation in the one or more identified intervals. The one or more changes are performed in the one or more intervals as scheduled.

The process then returns to step 200 in order to continue monitoring designated host operating parameters over multiple intervals, maintaining bitmaps and predicting change intervals in the manner indicated above.

Multiple additional instances of the FIG. 2 process may be performed in respective additional host devices that share the storage array. Other embodiments can include multiple storage arrays, with the disclosed functionality for automated change interval prediction being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for automated change interval prediction. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated change interval prediction arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
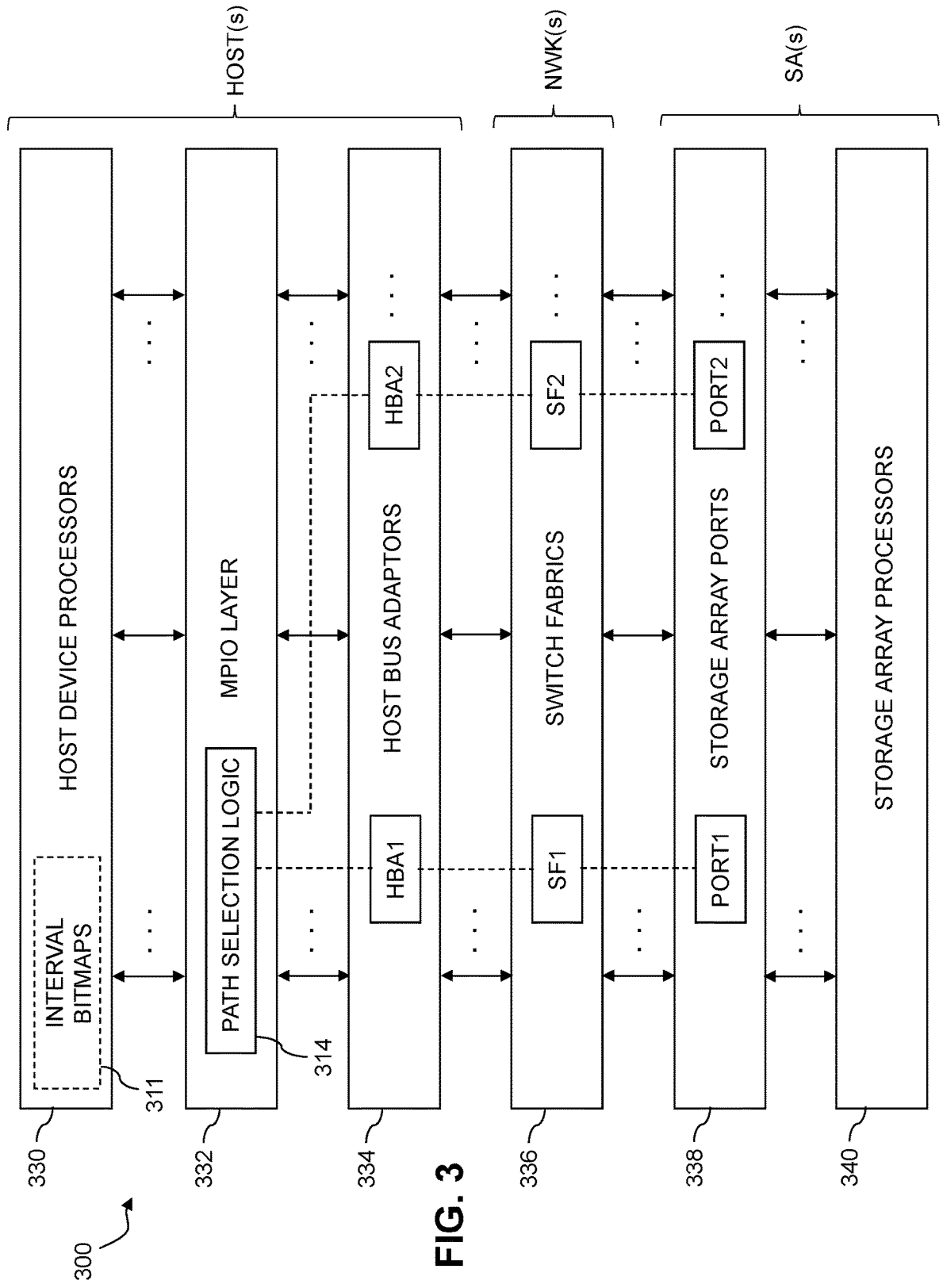
FIG. 3 is a block diagram showing multiple layers of a layered system architecture that includes a multi-path layer utilized in automated prediction of change intervals in an illustrative embodiment.

Referring now to FIG. 3, another illustrative embodiment is shown. In this embodiment, an information processing system 300 comprises interval bitmaps 311 and path selection logic 314. There may be separate instances of such elements associated with each of a plurality of host devices of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated change interval prediction through maintenance and utilization of stored interval bitmaps 311 via one or more MPIO drivers of the MPIO layer 332. The interval bitmaps 311 are illustratively shown as part of one or more host device processors of the host device processor layer 330. For example, the interval bitmaps 311 can be stored in a memory of one or more of the host device processors. A wide variety of other storage arrangements are possible, and the interval bitmaps 311 are therefore shown in dashed outline in the figure. For example, the interval bitmaps 311 in other embodiments are illustratively stored entirely in the MPIO layer 332. It is therefore possible in some embodiments that the interval bitmaps 311 can be stored utilizing a component of the MPIO layer 332, such as within a data structure of the path selection logic 314. The interval bitmaps 311 illustratively comprise interval classifications determined by one or more MPIO drivers of the MPIO layer 332 based at least in part on monitoring of host device operating parameters over multiple intervals, in the manner disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for automated change interval prediction substantially as previously described. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths, the path selection logic 314 illustratively limits amounts of IO operations that are delivered over one or more paths to particular ones of the ports of a storage array.

It is assumed in this embodiment that the host devices through their respective MPIO drivers and respective instances of path selection logic 314 provide functionality for automated change interval prediction, possibly with involvement of other host device components.

Accordingly, the path selection logic 314 utilizes the interval bitmaps 311 in determining appropriate paths over which to send particular IO operations to ports of one or more storage arrays. As described elsewhere herein, such automated change interval prediction can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed automated change interval prediction functionality, possibly with involvement of one or more other host device components.

FIG. 4 shows an example of a set of interval bitmaps 400-$i$ maintained over multiple time spans for a given host device 102-$i$, $i=1, 2, \ldots$ N, in conjunction with automated prediction of change intervals in an illustrative embodiment. Similar sets of interval bitmaps are illustratively maintained for one or more other ones of the host devices 102.

The set of interval bitmaps 400-$i$ more particularly comprises interval bitmaps maintained over respective multiple time spans $s=1, 2 \ldots$ S for a given host device 102-$i$, illustratively at least in part utilizing the MPIO driver 112-$i$ of that host device, in the manner described elsewhere herein. There is one interval bitmap for each of the S spans, for a total of S interval bitmaps in the set of interval bitmaps 400-$i$. Each interval bitmap in the set illustratively has substantially the same structure, and is identified by a corresponding span identifier, followed by a plurality of entries each corresponding to a particular one of a total of T time intervals within the span. The entries for respective ones of the T time intervals within a given one of the S spans are indexed by an interval index $t=1, 2, \ldots$ T, such that a particular time interval in one of the spans has corresponding time intervals in the same position in each of the other spans.

The entries for the time intervals in each span denote classifications of those time intervals in terms of whether the time intervals are preferred or non-preferred for use as change intervals. More particularly, an entry of the bitmap having a logic "1" value illustratively denotes that the corresponding interval of the span is designated as a preferred interval for all of the monitored host device operating parameters. An entry of the bitmap having a logic "0" value illustratively denotes that the corresponding interval of the span is designated as a non-preferred interval for at least one of the monitored host device operating parameters.

The MPIO driver 112-$i$ of the given host device 102-$i$ maintains the set of interval bitmaps 400-$i$ over the S spans, each comprising T time intervals, and identifies at least one particular interval that is repeatedly classified as preferred across multiple bitmaps of respective time spans. For example, the interval $t=2$, assuming it has a "1" value across each of the S spans in the set of bitmaps 400-$i$, as illustrated by the dashed box 402, is illustratively identified as a particular interval of this type. The MPIO driver 112-$i$ therefore schedules a change to the operating environment of the given host device 102-$i$ in the time interval $t=2$ in a future span, such as the next span S+1, or a different future span, such as span S+2, S+3, etc. The particular time interval $t=2$ is selected as a change interval so as to minimize adverse impacts on one or more applications executing on the given host device 102-$i$.

Numerous other types and arrangements of entries and fields can be used, and the term "bitmap" as used herein is therefore intended to be broadly construed. Such information once generated within the given host device 102-$i$ can be stored in a host device memory accessible to a multi-path layer of the host device. Other types of data structures can be used in addition to or in place of bitmaps in other embodiments. Also, as indicated above, multiple change intervals may be selected for a future span. These and other techniques for selection of one or more particular time intervals of one or more future spans as change intervals should be viewed as examples of what is referred to herein as "change interval prediction." Other types of change interval prediction involving other types of time intervals, spans, and host device components can be used in other embodiments.

The multi-pathing software portions of example processes described above may be similarly performed by a given MPIO driver on the corresponding host device, and similarly by other MPIO drivers on respective other host devices. Such MPIO drivers illustratively form a multi-path layer comprising multi-pathing software of the host devices.

The above-described processes and other features and functionality disclosed herein are presented by way of illustrative example only, and other embodiments can utilize additional or alternative arrangements. For example, certain process steps illustrated as being performed serially can instead be performed at least in part in parallel with one another.

Also, as mentioned previously, different instances of the above-described algorithms and other automated change interval prediction techniques can be performed by different MPIO drivers in different host devices.

The particular automated change interval prediction arrangements described above are therefore presented by way of illustrative example only. Numerous alternative arrangements of these and other features can be used in implementing the automated change interval prediction in other illustrative embodiments.

The illustrative embodiments disclosed herein can provide a number of significant advantages relative to conventional arrangements.

For example, some embodiments configure a multi-path layer of one or more host devices to include functionality for automated change interval prediction that can significantly reduce adverse impacts on one or more applications executing on a host device, when implementing changes to an operating environment of the host device during particular ones of the predicted change intervals.

The predicted optimal change intervals are illustratively utilized to make one or more changes in an operating environment of the one or more host devices while minimizing adverse impacts on applications, such as degradations in IO processing performance while the one or more changes are carried out.

As indicated previously herein, conventional approaches to determining change intervals for altering host device operating environments are problematic, in that a host administrator or other user generally has to perform an unduly complex manual estimation process in order to attempt to determine appropriate change intervals. Illustrative embodiments disclosed herein provide highly automated change interval prediction arrangements that avoid the complications of conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only.

Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different host device configurations and associated automated change interval prediction arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
the host device being configured to communicate with a storage system;
wherein the host device is further configured:
to monitor host device operating parameters relating to its interaction with the storage system over a plurality of intervals;
for each of the intervals, to aggregate threshold-based assessments of respective ones of the monitored host device operating parameters and to classify the interval based at least in part on the aggregated threshold-based assessments; and
to identify a particular future interval for use as a change interval for changing one or more characteristics of an operating environment of the host device based at least in part on the classified intervals;
wherein aggregating threshold-based assessments of respective ones of the monitored host device operating parameters for a given interval and classifying the interval based at least in part on the aggregated threshold-based assessments comprises:
computing a value for the given interval as a function of the aggregated threshold-based assessments; and
updating at least one data structure to include the computed value in an entry corresponding to the given interval.

2. The apparatus of claim 1 wherein the host device is further configured to schedule implementation of the change in the one or more characteristics of the operating environment of the host device in the identified particular future interval.

3. The apparatus of claim 1 wherein the host device operating parameters comprise two or more of at least number of input-output operation failures, number of input-output operation retries, input-output operation throughput, host device memory usage and host device processor usage.

4. The apparatus of claim 1 wherein the host device further comprises a multi-path layer comprising at least one multi-path input-output driver configured to control delivery of input-output operations from the host device to particular ports of the storage system over selected ones of a plurality of paths through a network.

5. The apparatus of claim 1 wherein a given one of the host device operating parameters comprises number of input-output operation failures, and the threshold-based assessment of the given parameter comprises:
designating a particular one of the intervals as preferred for the given parameter responsive to the number of input-output operation failures for the particular interval being below a threshold number of failures; and
designating the particular interval as non-preferred for the given parameter responsive to the number of input-output operation failures for the particular interval being at or above the threshold number of failures.

6. The apparatus of claim 1 wherein a given one of the host device operating parameters comprises number of input-output operation retries, and the threshold-based assessment of the given parameter comprises:
designating a particular one of the intervals as preferred for the given parameter responsive to the number of input-output operation retries for the particular interval being below a threshold number of retries; and
designating the particular interval as non-preferred for the given parameter responsive to the number of input-output operation retries for the particular interval being at or above the threshold number of retries.

7. The apparatus of claim 1 wherein a given one of the host device operating parameters comprises input-output operation throughput, and the threshold-based assessment of the given parameter comprises:
designating a particular one of the intervals as preferred for the given parameter responsive to the input-output operation throughput for the particular interval being below a threshold amount of input-output operation throughput; and
designating the particular interval as non-preferred for the given parameter responsive to the input-output operation throughput for the particular interval being at or above the threshold amount of input-output operation throughput.

8. The apparatus of claim 1 wherein a given one of the host device operating parameters comprises host device memory usage, and the threshold-based assessment of the given parameter comprises:
designating a particular one of the intervals as preferred for the given parameter responsive to the host device memory usage for the particular interval being below a threshold amount of host device memory usage; and
designating the particular interval as non-preferred for the given parameter responsive to the host device memory usage for the particular interval being at or above the threshold amount of host device memory usage.

9. The apparatus of claim 1 wherein a given one of the host device operating parameters comprises host device processor usage, and the threshold-based assessment of the given parameter comprises:
designating a particular one of the intervals as preferred for the given parameter responsive to the host device processor usage for the particular interval being below a threshold amount of host device processor usage; and
designating the particular interval as non-preferred for the given parameter responsive to the host device processor usage for the particular interval being at or above the threshold amount of host device processor usage.

10. The apparatus of claim 1 wherein the at least one data structure comprises a bitmap, and wherein aggregating threshold-based assessments of respective ones of the monitored host device operating parameters for a given interval and classifying the interval based at least in part on the aggregated threshold-based assessments comprises:

computing the value as a bit value for the given interval as a function of the aggregated threshold-based assessments; and updating the bitmap to include the computed bit value in an entry corresponding to the given interval.

11. The apparatus of claim 10 wherein the bitmap is maintained for a particular time span that includes the given interval and a plurality of other intervals, and wherein separate bitmaps are maintained for respective other time spans each including a same number of intervals as the particular time span.

12. The apparatus of claim 11 wherein identifying a particular future interval for use as a change interval for changing one or more characteristics of an operating environment of the host device based at least in part on the classified intervals comprises identifying a particular future time interval as a time interval that is repeatedly classified as preferred across multiple ones of the bitmaps maintained for respective time spans.

13. The apparatus of claim 11 wherein different sets of bitmaps are maintained for the host device and one or more additional host devices configured to communicate with the storage system, and wherein identifying a particular future interval for use as a change interval for changing one or more characteristics of an operating environment of the host device based at least in part on the classified intervals comprises identifying a particular future time interval as a time interval that is repeatedly classified as preferred across multiple ones of the bitmaps maintained for respective time spans for each of the host devices.

14. An apparatus comprising:
a host device comprising a processor coupled to a memory;
the host device being configured to communicate with a storage system;
wherein the host device is further configured:
to monitor host device operating parameters relating to its interaction with the storage system over a plurality of intervals;
for each of the intervals, to aggregate threshold-based assessments of respective ones of the monitored host device operating parameters and to classify the interval based at least in part on the aggregated threshold-based assessments; and
to identify a particular future interval for use as a change interval for changing one or more characteristics of an operating environment of the host device based at least in part on the classified intervals;
wherein aggregating threshold-based assessments of respective ones of the monitored host device operating parameters for a given interval and classifying the interval based at least in part on the aggregated threshold-based assessments comprises:
responsive to all of the threshold-based assessments of respective ones of the monitored host device operating parameters for the given interval indicating that the interval is designated as preferred, classifying the interval as preferred across the monitored host device operating parameters; and
responsive to at least one of the threshold-based assessments of respective ones of the monitored host device operating parameters for the given interval indicating that the interval is designated as non-preferred, classifying the interval as non-preferred across the monitored host device operating parameters.

15. A method performed by a host device comprising a processor coupled to a memory, the host device being configured to communicate with a storage system, the method comprising:
monitoring host device operating parameters relating to its interaction with the storage system over a plurality of intervals;
for each of the intervals, aggregating threshold-based assessments of respective ones of the monitored host device operating parameters and classifying the intervals based at least in part on the aggregated threshold-based assessments; and
identifying a particular future interval for use as a change interval for changing one or more characteristics of an operating environment of the host device based at least in part on the classified intervals;
wherein aggregating threshold-based assessments of respective ones of the monitored host device operating parameters for a given interval and classifying the interval based at least in part on the aggregated threshold-based assessments comprises:
computing a value for the given interval as a function of the aggregated threshold-based assessments; and
updating at least one data structure to include the computed value in an entry corresponding to the given interval.

16. The method of claim 15 wherein the at least one data structure comprises a bitmap, and wherein aggregating threshold-based assessments of respective ones of the monitored host device operating parameters for a given interval and classifying the interval based at least in part on the aggregated threshold-based assessments comprises:
computing the value as a bit value for the given interval as a function of the aggregated threshold-based assessments; and
updating the bitmap to include the computed bit value in an entry corresponding to the given interval.

17. The method of claim 16 wherein the bitmap is maintained for a particular time span that includes the given interval and a plurality of other intervals, and wherein separate bitmaps are maintained for respective other time spans each including a same number of intervals as the particular time span.

18. A computer program product comprising a non-transitory processor-readable storage medium having stored therein program code of one or more software programs, wherein the program code, when executed by a host device comprising a processor coupled to a memory, the host device being configured to communicate with the storage system, causes the host device:
to monitor host device operating parameters relating to its interaction with the storage system over a plurality of intervals;
for each of the intervals, to aggregate threshold-based assessments of respective ones of the monitored host device operating parameters and to classify the intervals based at least in part on the aggregated threshold-based assessments; and
to identify a particular future interval for use as a change interval for changing one or more characteristics of an operating environment of the host device based at least in part on the classified intervals;
wherein aggregating threshold-based assessments of respective ones of the monitored host device operating parameters for a given interval and classifying the interval based at least in part on the aggregated threshold-based assessments comprises:

computing a value for the given interval as a function of the aggregated threshold-based assessments; and updating at least one data structure to include the computed value in an entry corresponding to the given interval.

19. The computer program product of claim 18 wherein the at least one data structure comprises a bitmap, and wherein aggregating threshold-based assessments of respective ones of the monitored host device operating parameters for a given interval and classifying the interval based at least in part on the aggregated threshold-based assessments comprises:

computing the value as a bit value for the given interval as a function of the aggregated threshold-based assessments; and updating the bitmap to include the computed bit value in an entry corresponding to the given interval.

20. The computer program product of claim 19 wherein the bitmap is maintained for a particular time span that includes the given interval and a plurality of other intervals, and wherein separate bitmaps are maintained for respective other time spans each including a same number of intervals as the particular time span.

* * * * *